(12) United States Patent
Hillier et al.

(10) Patent No.: US 8,446,920 B2
(45) Date of Patent: May 21, 2013

(54) PROVIDING RESILIENT DIGITAL TELEPHONY SERVICES FOR WIRELESS DEVICE

(75) Inventors: Peter Matthew Hillier, Ottawa (CA); J. C. Mark Knox, Gatineau (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 28 days.

(21) Appl. No.: 13/134,706

(22) Filed: Jun. 14, 2011

(65) Prior Publication Data

US 2012/0320736 A1 Dec. 20, 2012

(51) Int. Cl.
 *H04J 3/16* (2006.01)
(52) U.S. Cl.
 USPC .......................................................... 370/469
(58) Field of Classification Search
 USPC .......................................................... 370/469
 See application file for complete search history.

(56) References Cited

U.S. PATENT DOCUMENTS

| | | | |
|---|---|---|---|
| 6,834,056 B2 * | 12/2004 | Hayes | 370/440 |
| 7,633,943 B2 | 12/2009 | MeLampy et al. | |
| 7,764,679 B2 | 7/2010 | MeLampy et al. | |
| 7,995,564 B1 * | 8/2011 | Boudreaux et al. | 370/352 |
| 2007/0237175 A1 * | 10/2007 | Benedyk et al. | 370/467 |
| 2008/0144605 A1 * | 6/2008 | Qiu et al. | 370/352 |
| 2010/0118830 A1 | 5/2010 | Stephenson et al. | |
| 2010/0150170 A1 * | 6/2010 | Lee et al. | 370/466 |
| 2011/0047413 A1 * | 2/2011 | McGill et al. | 714/15 |

FOREIGN PATENT DOCUMENTS

| WO | WO 2007/026160 A2 | 3/2007 |
|---|---|---|
| WO | WO 2010/132844 A2 | 11/2010 |

* cited by examiner

*Primary Examiner* — Fan Ng (57) ABSTRACT

A system and method for providing resilient digital telephony services for wireless communication devices are disclosed. The system comprises a plurality of wireless communication devices and a border gateway serving a communications network that is configured to communicate with the wireless communication devices. At least two telephony servers are located in the communications network. The servers are configured to communicate with at least a portion of the wireless communication devices. A heartbeat module is configured to communicate heartbeat signals between the border gateway and the telephony servers and redirect service in the event of a server failure.

20 Claims, 3 Drawing Sheets

FIG. 1

| Resiliency Table & Health Monitor | | | | | |
|---|---|---|---|---|---|
| DN | Contact | Primary | Secondary | Sync | Heartbeat |
| 613 555 2502 | 192.168.1.100 | Server C | Server B | TRUE | TRUE |
| 613 555 9447 | 192.168.1.101 | Server C | Server B | TRUE | TRUE |
| 613 555 7127 | 192.168.1.102 | Server A | Server C | TRUE | TRUE |
| 613 555 8019 | 192.168.1.103 | Server A | Server C | TRUE | TRUE |

PROVIDING RESILIENT DIGITAL TELEPHONY SERVICES FOR WIRELESS DEVICE

BACKGROUND

Business phones often have increased functionality compared with home phones or wireless (i.e. cellular) phones. For example, business phones can include the ability to connect multiple telephones together for a conference call, transfer incoming calls to another party, and create ring groups that allow a single call to ring to multiple extensions. The functionality has often been developed to increase productivity in business environments. The functionality has traditionally been provided by connecting business phones to private branch exchanges (PBXs).

As the use of mobile communication devices such as cell phones becomes omnipresent, the functionality of wired (fixed) business phones is converging to allow wireless phones to use the increased functionality traditionally offered by PBXs to fixed telephone systems.

Many mobile device manufacturers are designing dual mode phones that are capable of operating on carrier networks and private branch exchanges. For instance, a mobile device may be configured to operate using a Wimax connection to connect to a service provider's wireless network, while also operating through an Institute of Electrical and Electronics Engineers 802.11 "WiFi" standard to connect the mobile device to a business's private branch exchange server. The private branch exchange server can allow communication via Voice over Internet Protocol (VoIP), as well as the additional functionality afforded by PBXs.

As mobile device use in a business increases, there is a need to ensure the resiliency of the connection of a mobile device with the business's telecommunication system. Support for WiFi connected devices on the PBX side is not guaranteed and varies from vendor to vendor. Many VoIP protocols such as Session Initiation Protocol (SIP) rely on the Domain Name System (DNS) as the standard to provide resiliency.

The DNS standard requires a VoIP application operating on a mobile device to support DNS. DNS requires the use of timeouts to discover communication failures. Transmission protocols such as User Datagram Protocol (UDP) operate on a 32 second default timeout. However, this time period is typically too long for human interfaces. A person typically is not willing to wait for 32 seconds to determine if a telephone call is successful.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, a server is a physical computer dedicated to running one or more service programs used to serve the needs of programs running on other computing devices that are in communication with the server. The service program(s) can serve the needs or requests of other programs which may or may not be running on the same computer. A server can be a system comprised of software and hardware that is dedicated to a specific purpose such as a database server, a file server, a mail server, a print server, a telephony server, a credentials server, and so forth. Alternatively, a single server can be used to provide multiple services.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Voice over Internet Protocol (VoIP) protocols such as the Session Initiation Protocol (SIP) mandate the use of Domain Name Service (DNS) as the means to implement resiliency in the system. When a hardware failure, such as the failure of a Private Branch Exchange (PBX) server, is detected, the information can be re-routed to another PBX server. The DNS standard uses a Fully Qualified Domain Name (FQDN) that resolves to multiple Internet Protocol (IP) addresses. When a connection fails to be established after some time period, such as the 32 second time period used in the User Datagram Protocol (UDP) standard, the DNS server can be consulted for another name resolution which identifies an alternate route. A connection via the alternate route can then be attempted.

A typical wired phone system, such as the Public Switched Telephone Network (PSTN), has a timeout period that is much less than the 32 seconds proffered by the UDP standard. A person typically will not wait for 32 seconds when a phone call is connecting, or has already connected, for the VoIP data to be rerouted. If a user terminates a call before the full timeout period, the routing engine may not realize a problem existed. Repeated calls may continue to be directed to the failed route. Thus, the potentially lengthy timeout periods proffered by the DNS standard do not work well for human interface products such as cellular telephones.

If the DNS standard is not used, then traditional VoIP resiliency typically entails the use of static programming of the end device, which makes adding/deleting/moving end devices difficult. When using DNS, two or more different server addresses are typically used. This makes adding/deleting/moving service points for these devices within the network difficult.

Moreover, once a VoIP client has been moved to another service provider, the mechanisms to move the device back are varied and unclear. Some variants of DNS assume that all name resolutions are equal, which may not be the case. When priorities are assigned to name resolutions, this can lead to more delays when setting up telephone calls while error paths are repeatedly retried.

The VoIP protocol operating on a device such as a mobile phone can be modified (typically at software build time) to lower the timeout. Using DNS as an example, the 32 seconds could be lowered to something the more "reasonable". However, VoIP applications operating on the various devices cannot be assumed to be homogenous, resulting in a potentially disjoint collection of VoIP applications using different timers, ranging from N to 32 seconds, creating inconsistency in behaviors across the network.

To prevent the long user delays while providing consistency across the communications network, a VoIP client, such as a mobile (i.e. wireless) communication device, can be configured to send frequent automated messages to a telephony server to detect a failure before the end user is impacted. However, a typical telephony server can be used to route calls for hundreds, or even thousands of separate communication devices. When thousands of devices each send frequent automated messages, the result can appear similar to a distributed Denial of Service (DoS) attack. This can cause a heavy processing load on the server and can clog the communication lines to the server. Thus, sending frequent automated messages from the mobile communication device does not work well for telephony servers configured to route phone calls for a large number of mobile communication devices. In addition, sending frequent automated messages from mobile client can result in draining resources such as the mobile communications device battery.

A VoIP client, such as a mobile communication device, can be configured with two service providers. When one service provider does not respond, the other can be contacted. However, this can create a multi-provisioning issue, where both service providers are provisioned with information about the mobile communication device. The mobile communication device is also programmed with information regarding both service providers. This makes it difficult to move the device to another service provider, since configuration updates are performed on both of the service providers and the mobile communication device. Thus, this form of resiliency has a high configuration overhead.

To overcome these limitations, a communications network can include a border gateway. The border gateway can be located at the edge of a network and used to communicate between a plurality of mobile communication devices and a plurality of telephony servers in the network. Each telephony server may support tens, hundreds, or thousands of separate mobile communications devices. The border gateway can direct the data from the mobile communication device to a desired telephony server within the network.

The telephony servers can provide communication for each mobile communication device via a digital communication means such as VoIP or other forms of internet telephony. The telephony servers can also support additional functionality for each mobile communication device, such as the type of functionality provided by PBX servers to desktop phones. The additional functionality can include call forwarding, teleconferencing, the addition of ring groups, and so forth.

The border gateway can also be used to communicate a heartbeat message at a predetermined frequency with one or more of the telephony servers within the communications network. The heartbeat message can be used to determine the operational status of each telephony server. If one or more of the telephony servers fails due to a hardware failure and/or a software failure, and is no longer able to receive and route data to the mobile communications device as desired, the border gateway can quickly be used to redirect the mobile communication devices assigned to the failed server to a secondary telephony server. The mobile communication devices can use the secondary server until the device's primary server is again available for use.

The use of the border gateway to determine the operational status of the telephony servers in a network can substantially decrease the amount of time to identify a potential problem in the network that can disrupt communications. Rather than waiting up to 32 seconds for a timeout, as occurs under the UDP standard, the border gateway can send heartbeats continuously at a sub-second interval to enable a failure to be determined in less than one second. The border gateway can be used to communicate heartbeat messages with each telephony server at a significantly increased speed relative to the mobile communication devices since there is typically a single border gateway communicating with each telephony server. Thus, rather than receiving heartbeat messages from thousands of separate communication devices, the heartbeat message can be received from the single border gateway.

In addition, the use of the border gateway reduces the need for extended functionality on the mobile communication device. The mobile communication device can be ignorant of substantially all of the network functionality that occurs beyond the border gateway. There is no need for the mobile communication device to send or receive heartbeat type messages. There is also no need for the mobile communication device to be aware of or keep track of primary and backup telephony servers. These actions can all be accomplished by the border gateway interacting with each telephony server. This reduces the complexity of hardware and software issues on the mobile communication device and provides potential increases in battery life for the mobile devices.

The increased functionality of the border gateway allows backup server systems to be implemented more quickly and simply than traditional methods have allowed. For example, a mobile phone user can enter a hotel, restaurant, airport, or other location, connect to the local WiFi service, and connect to a telephony server that enables the user to take advantage of the extended functionality offered by private branch exchange (or other) type services while using the mobile communication device. Should a hardware and/or software problem occur that limits the functionality of the telephony server, the border gateway can quickly redirect the data flow to a secondary telephony server in a relatively short period of time. This allows the user to obtain substantially the same level of functionality from his or her mobile communication device that is typically available in a desktop phone. In addition, the functionality can be used with confidence that minimal disruptions will occur during important calls such as conference calls. In summary, even network transient devices that have no static configuration (e.g. temporary guests on the network at an airport or hotel) can be provided resilient services, since the functionality does not reside on the user's mobile communication device or require client involvement.

Figure 1:
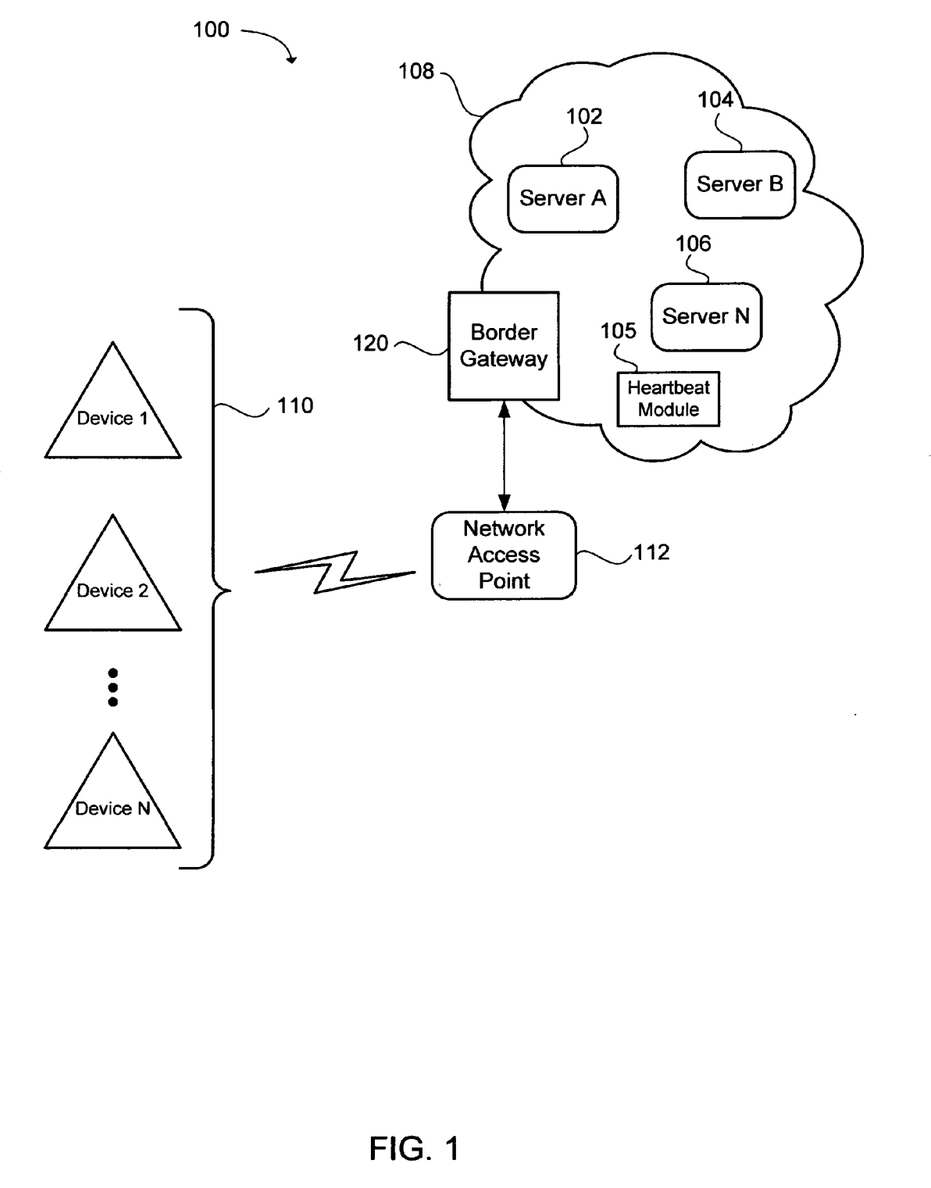
FIG. 1 illustrates an example diagram of a resilient PBX services system for mobile devices in accordance with an embodiment of the present invention.

One example of a network 100 is illustrated in FIG. 1. The network can include a plurality of telephony servers 102, 104, 106 located within a communications network 108. The communications network may be a local area network, a wide area network, or another type of network that allows the plurality of telephony servers to communicate. While three servers are shown, any number of servers may be included within the communications network. The servers may be geographically co-located. Alternatively, the servers within the communications network may be located at geographically disparate locations, such as in different buildings, different cities, different states, different provinces, or even different countries.

Each telephony server 102-106 can be configured to provide communication protocols for the delivery of digital voice communications to a mobile communication device such as a telephony handset. The handset may be wired or wireless. The communication protocols can also enable multimedia sessions, fax, Simple Message Service (SMS), and other desired communication services. The telephony servers can be configured as PBX servers to provide PBX services. Alternatively, one or more of the telephony servers may be any type of server capable of communicating via Internet Protocol (IP) or another protocol capable of effecting digital voice communication.

A plurality of mobile communication devices 110 can communicate with one or more of the telephony servers 102-106 in the communications network 108. There may be tens, hundreds, or thousands of mobile communication devices operable to communicate with each of the one or more telephony servers in the communications network.

The mobile communication devices 110 may be dual mode type devices that are configured to operate via a cellular standard such as the IEEE 802.16 standard or the $3^{rd}$ Generation Partnership Project (3GPP), as well as through a local wireless connection, such as an IEEE 802.11 wireless standard, a Bluetooth® standard, and the like. For instance, the mobile communication device may connect to a cellular type network when a local wireless network is not available. The mobile communication device can communicate via the local wireless connection when it is available. Communication through the local wireless connection can reduce billing costs and provide additional functionality to the mobile communication device, as previously discussed.

Alternatively, the mobile communication devices 110 may be single mode devices configured to wirelessly connect directly to the communications network 108 via the network access point 112.

In one embodiment, a mobile communication device 110 can connect directly with the network access point 112 via a longer range wireless communication standard than is available via the IEEE 802.11 and Bluetooth standards. For example, the mobile communication devices may connect to the network access point via one of the IEEE 802.16 standard and the 3GPP LTE standard.

In another embodiment, the mobile communication device 110 can connect to a local wireless network, such as an IEEE 802.11 or Bluetooth based network at a location that is physically distinct from the location of one or more of the telephony servers 102, 104, 106. Data from the wireless communication device can then be communicated from the distinct location to the network access point 112 via a wired network connection, such as via a wide area network or via the Internet.

Each mobile communication device 110 can connect with a server 102-106 in the communications network 108 through a network access point 112. The network access point may be a wireless access point configured to wirelessly communicate with the mobile communication devices. The network access point can also include a wired connection for communicating with the mobile communication devices via a wired connection, as previously discussed.

The network access point 112 can relay data between the mobile communication devices 110 and the telephony servers 102-106 via the border gateway 120. The border gateway is located at the edge of the communications network 108. The border gateway can act as a firewall that is configured to communicate using digital communication protocols. The border gateway can separate the communications network from an untrusted external network. The border gateway can provide access control and authorization to the mobile communication devices 110. In addition, the border gateway can provide a choke point for media streams, including voice streams.

The security provided by the border gateway 120 allows the communication capabilities provided by the telephony servers 102-106 to be extended to the mobile communication devices 110 at disparate locations over the internet. For instance, an employee can connect with his or her company telephony server via an IEEE 802.11 WiFi hotspot located at a business, hotel, restaurant, airport, home, or other location having WiFi access, while protecting the communications network 108 from a host of security concerns.

In one embodiment, the border gateway 120 can be a Mitel Border Gateway (MBG). Alternatively, the border gateway can be a Session Border Controller (SBC). The border gateway can serve as a SIP-aware firewall, enabling connection to SIP trunks without the need for third party firewall hardware. The border gateway can also allow encryption of the data communicated with the mobile communication devices 110. For instance, the border gateway can provide encryption via the secure embedded 128 bit Advanced Encryption Standard (AES) to encrypt voice communications and data using the Secure Real-time Transport Protocol (SRTP).

Other types of protocols supporting digital voice communications can be supported by the border gateway as well, including the H.323 protocol and the Media Gateway Control Protocol (MGCP). The border gateway can be configured to support substantially any type of digital voice communications standard that allows voice communications to be digitally communicated from a mobile communication device 110 to another telephony device via a telephony server 102, 104, 106.

The described capabilities of the border gateway 120 are provided for example only and are not intended to be exhaustive. The border gateway can provide additional features and securities that enable a mobile communication device 110 to connect to the communications network 110 from an outside location.

The mobile devices 110 can register for service with the border gateway 120. The communications network 108 beyond the gateway can be unknown to the mobile communication device. Telecommunication service can be arbitrated between the border gateway and the communications network using a standard such as SIP, H.323, MGCP, or through a proprietary protocol. Similarly, one of the protocols may be used on the service arbitration side of the communication network, comprising data flowing from the border gateway 120 to a telephony server 102-106 located within the communications network 108.

In one embodiment, the border gateway 120 can be a single point of failure. The hardware that comprises the border gateway can have desired resilient capabilities inherent to the hardware's design and function. For example, the border gateway may operate on a server that is fully redundant. The redundant server can have a backup server that is co-located with the border gateway server. Data that is communicated to the server on which the border gateway is located can automatically be transitioned to the backup server in a period of time sufficient that no noticeable disruption, or only brief disruptions may be noticed by a user of a mobile communication device when a failure of the border gateway occurs.

In another embodiment, the border gateway 120 can be comprised of two or more separate border gateways to offer a high-availability mode. Each border gateway can operate on a different server. A heartbeat can be communicated between each of the border gateways. The border gateways can share a "floating" IP address that always points to the currently active border gateway. The other border gateway(s) can provide a "warm backup" that can be switched into service quickly if a failure should occur in the active border gateway. The heartbeat between the border gateways can be communicated at a relatively high frequency, such as tens or hundreds of times per second. If a plurality of heartbeat responses are not received as expected at warm backup border gateway, service to the communications network 108 can quickly be redirected through the backup border gateway until the active border gateway recovers. The time to switch to a backup border gateway can typically be less substantially less than one second, although certain types of failures may result in longer failover times.

Each mobile communications device 110 can also operate using a selected communications protocol. An example is provided of mobile communication devices operating on the SIP protocol. However, the mobile communication devices may also operate using other protocols, as previously discussed. The mobile communication device may be a traditional wireless telephone. Alternatively, the mobile communication device may be configured primarily as a computing device, such as a tablet computer or other type of portable computing device that is also capable of voice communication via a digital telephony standard.

The plurality of mobile communication devices 110 can each operate as a SIP client. The SIP client can register with the border gateway 120. The border gateway can act as a back to back user agent (B2BUA), also referred to as a back to back user gateway. The B2BUA can terminate the SIP client messages received from the mobile communication devices. The SIP client messages can be re-originated from the B2BUA and communicated to the desired location in the communications network 110. This places the border gateway 120 directly in the signaling path for all communications in to and out of the communications network 108.

The use of SIP is provided as an example. Any VoIP protocol solution or mix of solutions may be employed. The border gateway 120 and telephony servers 102-106 can be configured to understand the protocol and to communicate with the mobile devices 110 such that service can be provided. The border gateway can be used to arbitrate connections to the telephony servers on behalf of the mobile communication device in order to provide failover service.

In one example embodiment, each of the telephony servers 102-106 can be a PBX server that is capable of using proprietary signaling. Each mobile communication device 110 can operate as a SIP client that is registered with the border gateway 120 using an identification means, such as a PBX extension or a cell phone number that is mapped to the SIP client's internal domain name or IP address. The signaling between the border gateway and each telephony server 102-106 can include resilient node information that can be used to identify one or more backup telephony servers in the communications network 108 for each SIP client.

For instance, one of the mobile communication devices 110, such as Device 2, can send a wireless communication signal containing registration information to the network access point 112. This information may be communicated using an IEEE 802.11 wireless standard. The information can be relayed from the network access point to the border gateway 120. The registration information can include a destination address, such as the IP address of the border gateway, and the identification information of Device 2, such as the devices cellular telephone number and/or IP address. The border gateway can send a response message to Device 2, letting the device know that registration is being attempted.

In one embodiment, the border gateway can send a registration request to one of the telephony servers located in the communications network 108, such as Server A. The registration request can include sufficient information to register the device using the desired protocol, such as SIP. For example, the registration request may include the destination address, such as Server A's IP address and the identification information for Device 2. Server A can send an acknowledgement response to the border gateway 120.

If Server A is the primary server for Device 2, then registration may proceed. If Server A is not the primary server, then it may respond with a message to the Border Gateway that identifies the primary and secondary servers for Device 2. Additional backup servers may be identified as well. For instance, a SIP redirect command may be sent from Server A to the border gateway 120 in response to the registration request for Device 2, identifying the primary server for Device 2 as Server C, and the secondary server for Device 2 as Server B. This process can be used if each of the telephony servers 102-106 include a list of the primary server and backup server(s) (i.e. secondary, tertiary, etc.) for each of the mobile communication devices 110.

One example of messaging that allows a SIP redirect can be as follows:

---

301 Moved Permanently
Via: SIP/2.0/UDP 192.168.1.1;branch=z9hG4bK5lyi742cx0
From: <sip:6138639447@192.168.1.50>;tag=rjab4mcg
To: <sip:6138639447@192.168.1.50>;tag=0_3976584208-94210418
Call-ID: 53ehmsj83rtz9ow70e
CSeq: 51684 REGISTER
Contact: <sip:192.168.1.52>;q=0.60,<sip:192.168.1.51>;q=0.40
Reason: SIP;text="The endpoint is not being served here"
P-Alternate-Server: <sip:192.168.1.52:5060;transport=udp>;state=active;ping-interval=60,<sip:192.168.1.51:5060;transport=udp>;state=inactive;ping-interval=60
Content-Length:                                                    0

---

Once the primary and secondary servers are known at the border gateway 120, a registration request can be sent from the border gateway to the primary server. In this example the primary server is Server C. The registration request can include Server C's address, such as its IP address, as well as the identification information for Device 2. Server C can send an acknowledgement message to the border gateway that identifies that registration is being attempted. When it has been completed, a registration success message can be sent from Server C to the border gateway. The border gateway can then send a registration success message to Device 2. A secondary registration message can be sent from the border gateway to Server B that notifies Server B of the identification information for Device 2 to enable Server B to contact Device 2 if Server C fails. Additional information may be communicated to other servers, such as a tertiary backup, if desired. Sufficient information can be communicated to the backup server(s) that the failover process can be accomplished in a relatively short amount of time and with the communication of a relatively small amount of data.

The border gateway 120 can maintain a mapping of information for the domain name to the resilient service telephony servers 102-106. For instance, when Device 2 is registered, the border gateway can store the resilient node information for Device 2. In this example the resilient node information comprises knowledge of Device 2's primary telephony server (Server C) and secondary telephony server (Server B). The border gateway can send a heartbeat message from the border gateway to each telephony server 102-106. Alternatively, each server may send a heartbeat message to the border gateway.

A heartbeat message is a message sent from an originator to a destination that enables the destination to identify if and when the originator fails or is no longer available. A failure or lack of availability may be due to a hardware problem with the server, a software problem with the server, or a routing problem to the server. The heartbeat messages are sent on a periodic basis, such as once every half second. The actual frequency of the heartbeat message depends on the desired time to detect a failure. Heartbeat messages may be communicated from once every few seconds to hundreds of times per second. When a heartbeat message is received, the receiving device can reply with an acknowledgement. When a failure to respond to several heartbeat messages occurs, a determination can be made that either the server has failed, or the communication path to the server has at least one failure.

The heartbeat message can be communicated from a heartbeat module 105. The heartbeat module can be comprised of software, firmware, and/or hardware. The heartbeat module may be located in or configured to communicate with at least one of the border gateway 120 and the plurality of telephony servers 102-106.

When a failure has been detected in one of the telephony servers 102-106 in the communications network 108, the border gateway 120 can identify the secondary server for each mobile communication device 110 assigned to the failed server (i.e. that list the failed server as a primary server). The secondary server can then be configured as the primary server in a failover process that allows the mobile communication device to operate on the secondary server. The border gateway can direct communication from the mobile communication device to the secondary server and the secondary server can direct communications for the mobile communication device based on the information received at registration. Additional information may be received from the border gateway regarding the mobile communication device when a failover occurs. The amount of information communicated at failover can be limited to reduce the risk of contention in the network caused by a flood of messaging when tens, hundreds, or thousands of mobile communication devices failover to the secondary server.

In the previous example, if a predetermined number of heartbeats communicated between Server C and the border gateway 120 are not responded to, the border gateway can inform Server B that it will now be the active server for Device 2. Server B can then receive communications for Device 2 and the border gateway can communicate data from Device 2 to Server B. The actual number of failed heartbeat responses that occur prior to declaring a server in a failure mode can depend on the software and hardware infrastructure of the network 100. The number may vary from as few as a single failed heartbeat response, to ten or more failed responses before a failure is declared and the failover response occurs.

In one embodiment, the border gateway 120 can ensure that all telephony servers 102-106 in the communication network 108 are in sync with the contact information for each mobile communication device 110. If a telephony server goes down, the heartbeat failure can be used to identify that each of the telephony servers contain the synchronized contact information when the heartbeat is restored.

Figure 2:
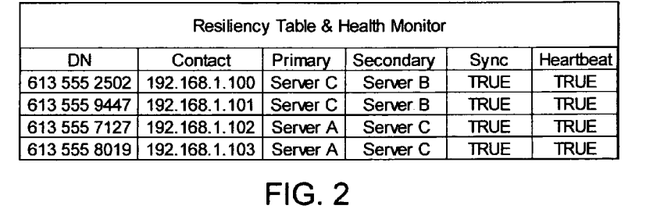
FIG. 2 illustrates an example of a lookup table containing resilient node information for mobile communication devices in accordance with an embodiment of the present invention.

In one embodiment, the border gateway 120 can create a table of resilient services using the responses from the telephony server. For instance, when a redirect message is received, that information can be stored in the table of resilient services. FIG. 2 contains one example of a table of resilient services.

Since the secondary telephony server maintains a list of the mobile computing devices that may require backup service (i.e. that will use it as a secondary telephony server), a single message from the border gateway can be sent to the secondary telephony server when the primary telephony server heartbeat (or heartbeat response) fails. The border gateway 120 can use a lookup table, such as the table in FIG. 2, to determine if such a notice needs to be sent. A single notice can be sent for all devices requiring backup service on a secondary telephony server. Upon receipt of the server node failure notice from the border gateway, the backup server can activate (place in service) the list of contacts that it has received during the registration process.

For example, FIG. 2 shows that if the border gateway 120 detects a failure related with Server A, the border gateway can notify Server C. Server C can then place DNs 613 555 1127 and 613 555 8019 into service. PBX C can know how to reach these DNs to route calls to them since the contact information was received during the registration process. Whenever contact information has been updated at any server in the communication network 108, the information can then be updated in the remaining servers. When this information is updated, a report can be sent to the border gateway identifying that the information is synchronized. This information can be stored in the lookup table.

The actual client device, such as Device 2, is not aware that the PBX service has changed. If a call is not in process then the user will not know that a failure occurred. If a call is in process, a brief outage may occur during a phone call or operation of a PBX service. However, the outage can be relatively brief, lasting just long enough for border gateway 120 to determine that a heartbeat failure has occurred, send a message to the secondary server(s) for the mobile communication devices operating on the failed server, and allow the secondary server(s) to begin operation. The total outage may be anywhere from less than one second to less than 5 seconds, depending on the types of hardware used. While longer outages may occur, they are atypical. This is a significant improvement over the standard UDP detection method that may take up to 32 seconds just to identify that an outage has occurred in a server. Moreover, the failure detection operates on behalf of the plurality of mobile communications devices 110. Each of the mobile communications devices can be moved to the new telephony server as a result of the single failure detection.

If the telephony servers 102-106 in the communications network 108 use only pure SIP interfaces (no proprietary signaling) and there is not integration with the border gateway, a second option can be used in which the servers do not sync contact information. In this approach, the border gateway 120 can fully reuse existing SIP standards to interoperate with a SIP compliant telephony server, such as a PBX cluster.

The border gateway contains the resiliency node information for each DN. A table similar to the example illustrated in FIG. 2 can be used. Rather than building the table based on the redirect messages received from the telephony servers, as previously discussed, the table can be statically created via configuration. Thus, in this example, the synchronization field would not be needed. This can be used to extend the solution to a group of servers 102-106 which do not support a common or homogeneous signaling protocol to relay/share client information, or which do not support a shared resiliency model.

Using the second approach, the border gateway can then determine immediately the correct telephony server on which to register a mobile communication device. The table can also be used to identify which server to connect the mobile communication device in case of a server failure. However, the border gateway will issue full device register messages to the secondary server when a failure is detected. This may result in a signaling overload during failure scenarios resulting in a delay of network stabilization.

Figure 3:
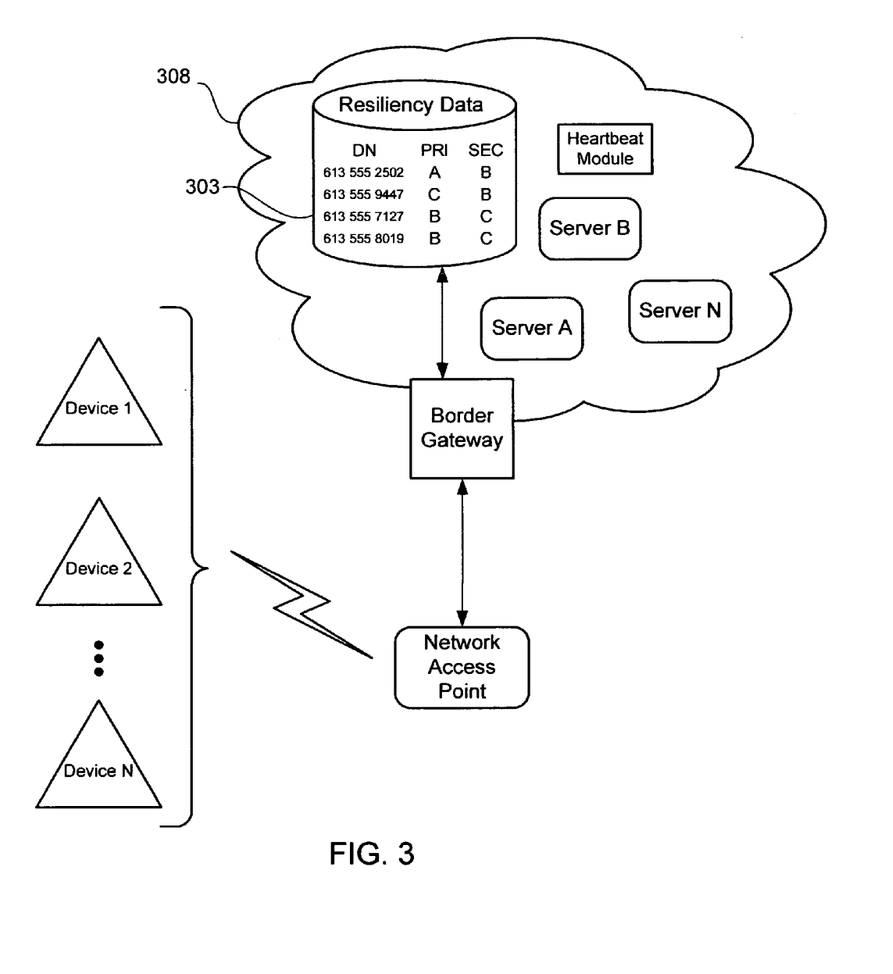
FIG. 3 illustrates another example diagram of a resilient PBX services system for mobile devices in accordance with an embodiment of the present invention.

FIG. 3 illustrates an example in which the resiliency data is stored in a database 302 that is in communication with the border gateway. In this example, each of the telephony servers in the communications network 308 does not contain the resiliency node information for each DN. Therefore, the information does not have to be updated and synchronized on each of the servers. Rather, the information can be maintained in the lookup table in the database 303.

An example registration process based on the system illustrated in FIG. 3 will now be provided. A mobile device, such as Device 2, can send a SIP registration command to the border gateway through the network access point. The border gateway can then send an acknowledgement back to Device 2. The resiliency data for Device 2 can then be obtained. The data, comprising the primary and secondary telephony servers on which Device 2 will operate may be input manually into the database 303. The border gateway will send a SIP registration message to Server C that comprises the server's IP number as well as the contact number for Device 2. The contact number may include the DN number and/or the IP number for Device 2. Server C can then report a successful registration to the border gateway. The border gateway can then report a successful registration to device 2 through the network access point.

The example systems described in FIGS. 1 and 3 both enable resiliency to be maintained with each of the mobile communication devices, wherein the mobile communication device is not aware of the resiliency, nor is any programming required on the part of the mobile user. In one embodiment, the DN for each mobile communication device can be bound to the cell number of the device. This allows cell numbers that are linked to the internal DN to become instantly resilient.

For purposes of routing telephone calls from the communication network to the mobile user, the resilient data can be assumed to be updated when a mobile communication device is placed into service. This reflects standard resiliency practices.

The single message failover notification is highly scalable, since a single message can be used to represent potentially thousands of devices. For instance, a heartbeat may be communicated between the border gateway and each telephony server in the communication network once every 500 milliseconds (ms). When the border gateway detects activity from a mobile user (i.e. the user places a phone call) during a failover scenario, the border gateway can request the telephony server, such as a PBX, to immediately place the device in service on the secondary telephony server. This allows the mobile communication device to jump the queue and enter service immediately to satisfy the user action.

The border gateway heartbeat mechanism will detect when the failed node recovers by again detecting heartbeat messages at the predetermined frequency. The process can then be simply reversed. With reference to FIG. 1, the recovered telephony server can be synchronized and requested to place the devices listed in the resilient data table into service. The currently active secondary telephony server can be asked to relinquish service. With reference to FIG. 3, the border gateway can deregister the device from the secondary telephony server and register it with the primary telephony server one at a time to maintain full SIP compliance.

Figure 4:
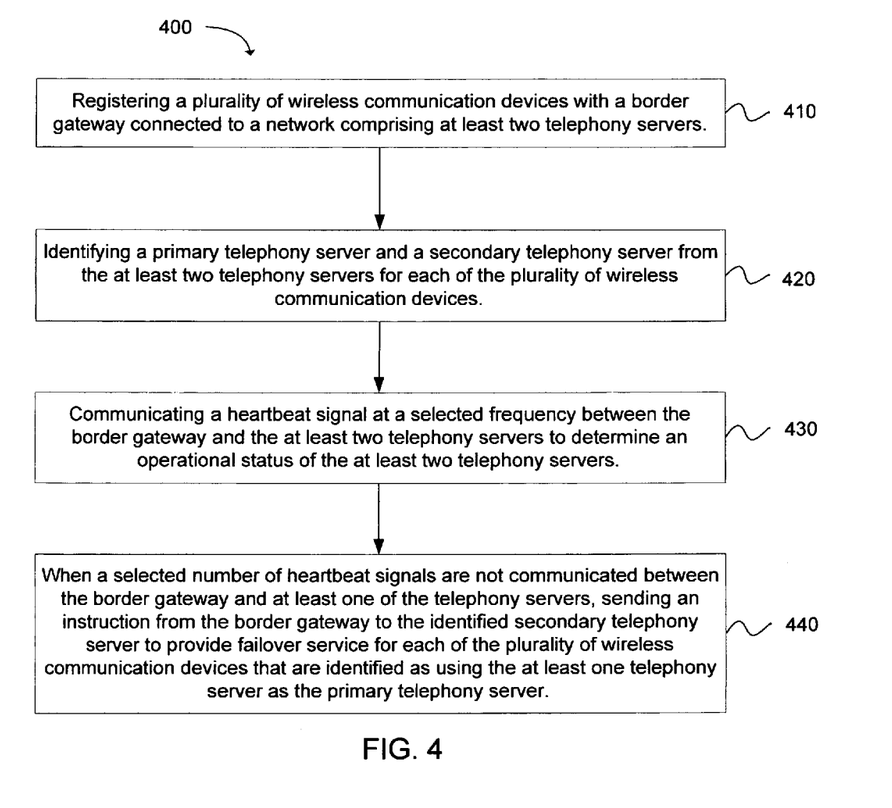
FIG. 4 depicts a flow chart of a method for providing resilient private branch exchange services for mobile devices in accordance with an embodiment of the present invention.

In another embodiment, a method for providing resilient digital telephony services for wireless communication devices is disclosed, as depicted in the flow chart of FIG. 4. The method comprises registering 410 a plurality of wireless communication devices with a border gateway connected to a network comprising at least two telephony servers. A primary telephony server and a secondary telephony server are identified 420 from the at least two telephony servers for each of the plurality of wireless communication devices. A heartbeat signal is communicated 430 at a selected frequency between the border gateway and the at least two telephony servers to determine an operational status of the at least two telephony servers. When a selected number of heartbeat signals are not communicated between the border gateway and at least one of the telephony servers, an instruction is sent 440 from the border gateway to the identified secondary telephony server to provide failover service for each of the plurality of wireless communication devices that are identified as using the at least one telephony server as the primary telephony server.

While various examples have been provided for connecting mobile communication devices to the digital telephony servers, the examples are not meant to be limiting. Other types of computing devices including mobile computing devices can also be connected to the digital telephony servers. The border gateway can then be used to provide a resilient connection to one of the digital telephony servers without the need for the computing device to be aware of which server it is in communication with, as previously described.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for providing resilient digital telephony services for wireless communication devices, comprising:
    registering a plurality of wireless communication devices with a border gateway connected to a network comprising at least two telephony servers, wherein the border gateway is a back to back user gateway configured to receive session initiation protocol (SIP) messages from each of the plurality of wireless communication devices, terminate the SIP messages, and re-send the messages from the back to back user gateway;
    identifying a primary telephony server and a secondary telephony server from the at least two telephony servers for each of the plurality of wireless communication devices;
    communicating a heartbeat signal at a selected frequency between the border gateway and the at least two telephony servers to determine an operational status of the at least two telephony servers; and
    when a selected number of heartbeat signals are not communicated between the border gateway and at least one of the telephony servers, sending an instruction from the border gateway to the identified secondary telephony server to provide failover service for each of the plurality of wireless communication devices that are identified as using the at least one telephony server as the primary telephony server.

2. The method of claim 1, further comprising registering the plurality of wireless communication devices with the border gateway connected to the network, wherein the at least two telephony servers are configured to provide private branch exchange services to the plurality of wireless communication devices.

3. A method for providing resilient digital telephony services for wireless communication devices, comprising:
    registering a plurality of wireless communication devices with a border gateway connected to a network comprising at least two telephony servers:
    identifying a primary telephony server and a secondary telephony server from the at least two telephony servers for each of the plurality of wireless communication devices:
    communicating a heartbeat signal at a selected frequency between the border gateway and the at least two telephony servers to determine an operational status of the at least two telephony servers; and
    when a selected number of heartbeat signals are not communicated between the border gateway and at least one of the telephony servers, sending an instruction from the border gateway to the identified secondary telephony server to provide failover service for each of the plurality of wireless communication devices that are identified as using the at least one telephony server as the primary telephony server, wherein registering the plurality of wireless communication devices further comprises:

storing resilient node information for each of the plurality of wireless communication devices in each of the at least two telephony servers, wherein the resilient node information includes at least the primary telephony server, the secondary telephony server, and the contact information for each of the plurality of wireless communication devices;

sending a registration request for a selected wireless communication device from the border gateway to one of the at least two telephony servers; and redirecting the registration request to the primary telephony server for the selected wireless communication device based on the stored resilient node information.

4. The method of claim 3, wherein the resilient node information is synchronized on each of the at least two telephony servers.

5. The method of claim 3, wherein storing resilient node information further comprises obtaining the resilient node information at the border gateway that is received when the registration request is redirected from one of the at least two telephony servers.

6. The method of claim 3, wherein sending an instruction from the border gateway to the identified secondary telephony server to provide failover service for each of the plurality of wireless communication devices comprises sending a single instruction that allows each of the plurality of wireless communication devices to failover using the resilient node information on the secondary telephony server.

7. A method for providing resilient digital telephony services for wireless communication devices, comprising:

registering a plurality of wireless communication devices with a border gateway connected to a network comprising at least two telephony servers;

identifying a primary telephony server and a secondary telephony server from the at least two telephony servers for each of the plurality of wireless communication devices;

communicating a heartbeat signal at a selected frequency between the border gateway and the at least two telephony servers to determine an operational status of the at least two telephony servers; and when a selected number of heartbeat signals are not communicated between the border gateway and at least one of the telephony servers, sending an instruction from the border gateway to the identified secondary telephony server to provide failover service for each of the plurality of wireless communication devices that are identified as using the at least one telephony server as the primary telephony server, wherein registering the plurality of wireless communication devices further comprises:

storing resilient node information for each of the plurality of wireless communication devices in a database coupled to the border gateway, wherein the resilient node information includes at least the primary telephony server, the secondary telephony server, and the contact information for each wireless communication device; and sending a registration request for a selected wireless communication device from the border gateway to one of the at least two telephony servers identified as the primary telephony server in the resilient node information in the database.

8. The method of claim 7, wherein the border gateway is a back to back user gateway configured to receive session initiation protocol (SIP) messages from each of the plurality of wireless communication devices, terminate the SIP messages, and re-send the messages from the back to back user gateway.

9. A resilient digital telephony system for wireless devices, comprising:

a plurality of wireless communication devices;

a border gateway serving a communications network that is configured to communicate with the plurality of wireless communication devices, the border gateway is one of a Mitel Border Gateway and a session border controller;

at least two telephony servers located in the communications network configured to communicate with at least a portion of the plurality of wireless communication devices through the border gateway and perform as at least one of a primary telephony server and a secondary telephony server for the portion of the plurality of wireless communication devices; and a heartbeat module configured to communicate heartbeat signals between the border gateway and the plurality of telephony servers.

10. The system of claim 9, further comprising a resilient node database containing resilient node information including a primary telephony server and a secondary telephony server for each of the plurality of mobile communication devices.

11. The system of claim 10, wherein the resilient node database is synchronized on each of the at least two telephony servers.

12. The system of claim 10, wherein the resilient node database is coupled to the border gateway.

13. The system of claim 9, wherein the border gateway is configured to send a command to instruct the secondary telephony server to provide failover service for the portion of wireless communication devices when a selected number of heartbeat signal responses are not communicated between the border gateway and at least one of the telephony servers.

14. The system of claim 9, wherein the heartbeat module is located in at least one of the plurality of servers and the border gateway.

15. A computer program product, comprising a non-transitory computer usable medium having a computer readable program code embodied therein, said computer readable program code adapted to be executed to implement a method for providing resilient digital telephony services for wireless communication devices, comprising:

registering a plurality of wireless communication devices with a border gateway connected to a network comprising at least two telephony servers;

identifying a primary telephony server and a secondary telephony server from the at least two telephony servers for each of the plurality of wireless communication devices; and communicating a heartbeat signal at a selected frequency between the border gateway and the at least two telephony servers to determine an operational status of the at least two telephony servers, wherein registering the plurality of wireless communication devices further comprises:

storing resilient node information for each of the plurality of wireless communication devices in each of the at least two telephony servers, wherein the resilient node information includes at least the primary telephony server, the secondary telephony server, and the contact information for each of the plurality of wireless communication devices;

sending a registration request for a selected wireless communication device from the border gateway to one of the at least two telephony servers; and redirecting the registration request to the primary telephony server for the selected wireless communication device based on the stored resilient node information.

16. The computer program product of claim 15, further comprising sending an instruction from the border gateway to the identified secondary telephony server to provide failover service for each of the plurality of wireless communication devices that that are identified as using the at least one telephony server as the primary telephony server when a selected number of heartbeat signals are not communicated between the border gateway and at least one of the telephony servers.

17. The computer program product of claim 16, wherein sending an instruction from the border gateway to the identified secondary telephony server to provide failover service for each of the plurality of wireless communication devices comprises sending a single instruction that allows each of the plurality of wireless communication devices to failover using the resilient node information on the secondary telephony server.

18. A computer program product, comprising a non-transitory computer usable medium having a computer readable program code embodied therein, said computer readable program code adapted to be executed to implement a method for providing resilient digital telephony services for wireless communication devices, comprising:

registering a plurality of wireless communication devices with a border gateway connected to a network comprising at least two telephony servers;

identifying a primary telephony server and a secondary telephony server from the at least two telephony servers for each of the plurality of wireless communication devices: and communicating a heartbeat signal at a selected frequency between the border gateway and the at least two telephony servers to determine an operational status of the at least two telephony servers, wherein registering the plurality of wireless communication devices further comprises:

storing resilient node information for each of the plurality of wireless communication devices in a database coupled to the border gateway, wherein the resilient node information includes at least the primary telephony server, the secondary telephony server, and the contact information for each wireless communication device; and sending a registration request for a selected wireless communication device from the border gateway to one of the at least two telephony servers identified as the primary telephony server in the resilient node information in the database.

19. The computer program product of claim 18, further comprising sending an instruction from the border gateway to the identified secondary telephony server to provide failover service for each of the plurality of wireless communication devices that that are identified as using the at least one telephony server as the primary telephony server when a selected number of heartbeat signals are not communicated between the border gateway and at least one of the telephony servers.

20. The computer program product of claim 19, wherein sending an instruction from the border gateway to the identified secondary telephony server to provide failover service for each of the plurality of wireless communication devices comprises sending a single instruction that allows each of the plurality of wireless communication devices to failover using the resilient node information on the secondary telephony server.

* * * * *